United States Patent
Renner et al.

(10) Patent No.: US 11,455,230 B2
(45) Date of Patent: Sep. 27, 2022

(54) EVENT SPECIFIC LOG FILE GENERATION

(71) Applicant: International Business Machines Corporation, Armonk, NY (US)

(72) Inventors: Stefan Renner, Stuttgart (DE); Christian Wilhelm Paul Hoerst, Boeblingen (DE); Johannes Kern, Boeblingen (DE); Eberhard Schoeck, Altdorf (DE); Felix Beier, Haigerloch (DE)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 17/068,855

(22) Filed: Oct. 13, 2020

(65) Prior Publication Data

US 2021/0149790 A1 May 20, 2021

(30) Foreign Application Priority Data

Nov. 20, 2019 (EP) .................................... 19210281

(51) Int. Cl.
*G06F 11/00* (2006.01)
*G06F 11/36* (2006.01)
(Continued)

(52) U.S. Cl.
CPC ...... *G06F 11/3612* (2013.01); *G06F 11/0778* (2013.01); *G06F 11/366* (2013.01);
(Continued)

(58) Field of Classification Search
CPC ............. G06F 11/0778; G06F 11/3636; G06F 11/366; G06F 11/3612; G06F 11/3472;
(Continued)

(56) References Cited

U.S. PATENT DOCUMENTS 7,661,032 B2  2/2010 Eberbach
9,122,694 B1 * 9/2015 Dukes .................. G06F 3/0608
(Continued)

OTHER PUBLICATIONS

"First Failure Data Capture (FFDC) Technique", An IP.com Prior Art Database Technical Disclosure, Authors et al.: Disclosed Anonymously, IP.com No. IPCOM000222155D IP.com Electronic Publication Date: Sep. 20, 2012, 5 pages.
(Continued)

*Primary Examiner* — Marc Duncan
(74) *Attorney, Agent, or Firm* — Stephen R. Yoder

(57) ABSTRACT

The present disclosure relates to generating an event specific log file for a computer system. The generation comprises storing buffered log data in at least one memory buffer during an execution of one or more threads in real time. The generation further comprises receiving thread execution data. The generation further comprises inputting the thread execution data into an anomalous program event detector module configured to generate an anomalous program event signal in response to detecting an anomalous program execution event. The generation further comprises searching the buffered log data for event specific log data in the at least one memory buffer with a log dependency analyzer module in response to the anomalous program event signal. The method further comprises writing the event specific log data to an event specific log file using a log archive writer module.

20 Claims, 4 Drawing Sheets

(51) Int. Cl.
  *G06F 16/17* (2019.01)
  *G06F 16/11* (2019.01)
  *G06F 11/07* (2006.01)

(52) U.S. Cl.
  CPC ........ *G06F 11/3636* (2013.01); *G06F 16/113* (2019.01); *G06F 16/1734* (2019.01); *G06F 11/0706* (2013.01)

(58) Field of Classification Search
  CPC ............ G06F 11/3476; G06F 11/3075; G06F 11/3082
  See application file for complete search history.

(56) References Cited

U.S. PATENT DOCUMENTS

| | | | |
|---|---|---|---|
| 9,459,911 B2 | 10/2016 | Liu | |
| 10,078,571 B2 | 9/2018 | Altman | |
| 10,235,252 B1 | 3/2019 | Lieberman | |
| 10,671,726 B1* | 6/2020 | Paithane | H04L 63/1416 |
| 2006/0005080 A1* | 1/2006 | Walker | G06N 20/00 |
| 2011/0320884 A1 | 12/2011 | Thilagar | |
| 2017/0102919 A1* | 4/2017 | Karppanen | G06F 5/065 |
| 2018/0307551 A1* | 10/2018 | Bacha | G06F 11/0766 |
| 2019/0228296 A1* | 7/2019 | Gefen | G06F 11/079 |
| 2019/0324649 A1* | 10/2019 | Rodgers | G06F 9/544 |
| 2020/0341868 A1* | 10/2020 | Carpenter | G06F 11/0709 |
| 2021/0397498 A1* | 12/2021 | Sakae | G06F 11/0709 |

OTHER PUBLICATIONS

Brandt et al., "Large-scale Persistent Numerical Data Source Monitoring System Experiences", 2016 IEEE International Parallel and Distributed Processing Symposium Workshops, pp. 1711-1720, DOI 10.1109/IPDPSW.2016.188.

Renner et al., "Event Specific Log File Generation", European Application No. EP19210281.2, filed Nov. 20, 2019, 27 pages.

Sun, Hai Tao, "First Failure Data Capture in Embedded System", IEEE EIT 2007 Proceedings, pp. 183-187, <https://ieeexplore.ieee.org/document/4374434>.

* cited by examiner

EVENT SPECIFIC LOG FILE GENERATION

BACKGROUND OF THE INVENTION

The present invention relates to the field of digital computer systems, and more specifically, to the generation of event specific log file generation.

Programs executing on a computer system may cause problems with the stability of the computer system and/or contain execution errors. Log messages in Log files may be used to study these errors and problems.

SUMMARY

The invention provides for a method, a computer program product and a computer system in the independent claims. Embodiments are given in the dependent claims. Embodiments of the present invention can be freely combined with each other if they are not mutually exclusive.

In one aspect the invention provides for a method of generating an event-specific log file for a computer system. The method comprises storing buffered log data in at least one memory buffer during the execution of one or more threads in real time. The method further comprises receiving thread execution data descriptive of the execution of the one or more threads in real time. The thread execution data may for example be data which is descriptive of the condition or state of the computer system as the various threads are executed. The thread execution data may also be data which describes the current operation and function of programs or other executable code that are executed within the one or more threads.

The method further comprises inputting the thread execution data into an anomalous program event detector module. The anomalous program event detector module is configured to detect an anomalous program execution event in the thread execution data. An anomalous program execution event as used herein encompasses an error or abnormal execution of part of a program executed in one of the threads or it may also represent an anomalous event in the operating system or other systems of a computer system that are related to or caused by the execution of the one or more threads. The anomalous program event detector module is further configured to generate an anomalous program event signal in response to detecting the anomalous program execution event in the thread execution data. The anomalous program event signal may for instance be used to identify when and what type of anomalous or error event has been detected.

The method further comprises searching the buffered log data for event-specific log data in the at least one memory buffer with a log dependency analyzer module in response to the anomalous program event detector module generating the anomalous program event signal. The log dependency analyzer module is configured for selecting event-specific log data from the buffered log data specified by the anomalous program execution event. In response to receiving the anomalous program event signal the log dependency analyzer module is able to search the buffered log data to find events that are related to or relevant to the anomalous program execution event.

The method further comprises writing the event-specific log data to an event-specific log file using a log archive writer module configured to format the event-specific log data as the event-specific log file.

In another aspect, the invention provides for a computer program product comprising a computer-readable storage medium having a computer-readable program code embodied therewith. The computer-readable program code is configured to implement the method.

In another aspect the invention provides for a computer system that comprises a processor configured for controlling the computer system. The computer system comprises a memory storing computer-readable program code. Execution of the computer-readable program code causes the processor to store buffered log data in at least one memory buffer during the execution of one or more threads in real time. Execution of the computer-readable program code further causes the processor to receive thread execution data descriptive of the execution of the one or more threads in real time.

Execution of the computer-readable program code further causes the processor to input the thread execution data into an anomalous program event detector module. The anomalous program event detector module is configured to generate an anomalous program event signal in response to detecting an anomalous program execution event in the thread execution data. Execution of the computer-readable program code further causes the processor to search the log data in the at least one memory buffer with a log dependency analyzer module in response to the anomalous program event detector module signaling the anomalous program event. The log dependency analyzer module is configured for selecting event-specific log data from the buffered log data according to the anomalous program execution event. Execution of the computer-readable program code by the processor causes it to write the event-specific log data to the event-specific log file using a log archive writer module configured to format the event-specific log data as the event-specific log file.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
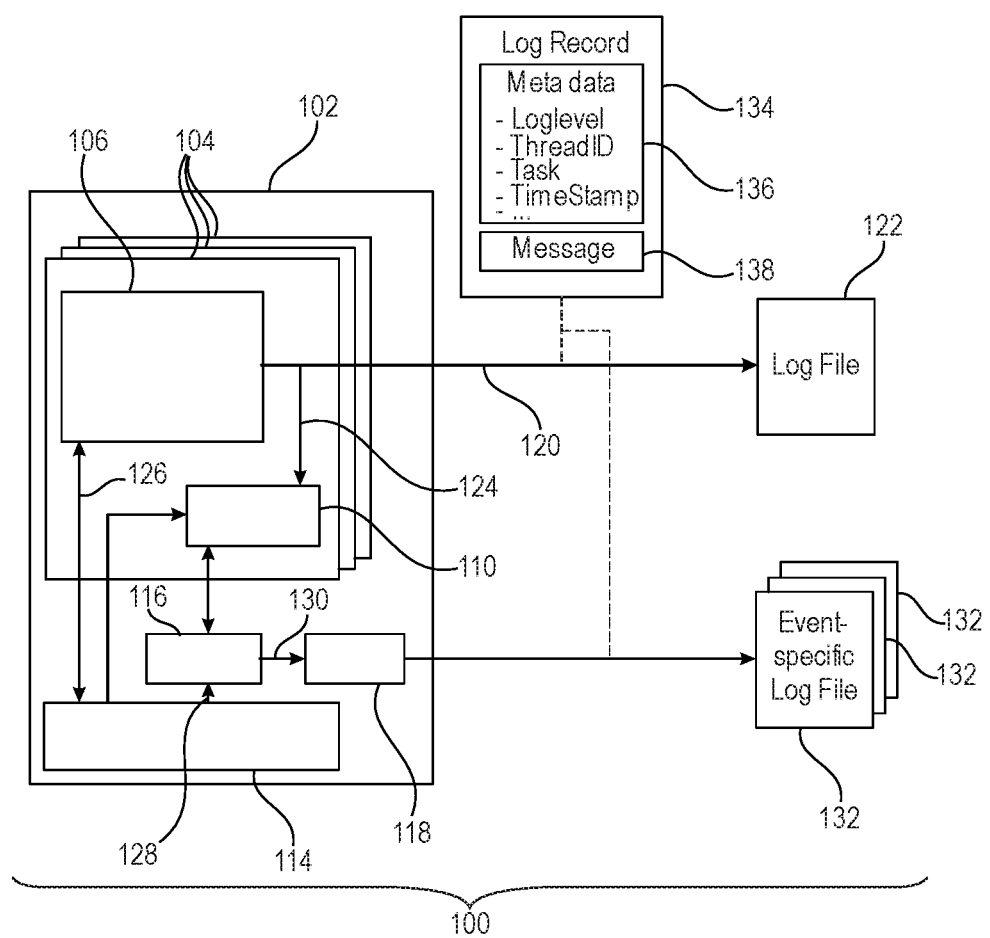
FIG. 1 illustrates an implementation of a computer system.

Embodiments of the invention may be advantageous because these are able to automatically gather data relating to a particular anomalous program execution event and write the log data to an event-specific log file. Commonly when programs are executing, in particular within multiple threads, it may be difficult or even impractical to record all of the log data that is available. Embodiments may provide for a means of saving only those log records which are relevant to a particular anomalous program execution event. Another benefit may be that the log records that are in the event-specific log file are already grouped together so that it makes it easier to study the reason of failure for the particular anomalous program execution event. If the entire log data were stored as a single log file then the user or operator reviewing the log file would then have a difficult time telling which of the log records are relevant to a particular anomalous program execution event.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Examples may provide for an improved means of generating an event specific log file. This may be achieved by buffering the log data in at least one memory buffer. During execution of at least one thread, thread execution data is received. The thread execution data is then input into an anomalous program event detector module. The anomalous program event detector module is configured to detect anomalous program events in the thread execution data. If an anomalous program event is detected, then the anomalous program event detector module sends an anomalous program event signal to a log dependency analyzer. Upon receiving the signal, the log dependency analyzer searches the buffered log data for event specific log data. A log archive writer module then writes the event specific log data into an event specific log file. The advantages of such a system were discussed above.

In another example, the at least one memory buffer comprises a thread memory buffer for each of the one or more threads. Each of the one or more threads the buffered log data is divided into and stored as thread-specific log data in the respective thread memory buffer. In this embodiment each thread has its own thread memory buffer. When a new thread is called into existence a thread memory buffer may be created for it. This may ease the task of allocating sufficient memory buffer space for the log data. As threads are created the needed thread memory buffer may be created or allocated on the fly as it is needed. Another advantage may be that the buffered log data associated with a particular thread will be stored in the thread memory buffer of that thread. This may help separate out the buffered log data so that it is then easier to find the buffered log data related to a failure within for a particular thread.

In another example, the anomalous program event detector module is configured to detect the anomalous program execution event by correlating the thread-specific log data across at least one thread memory buffer. For example, if a program on a thread is not running properly it may have a global effect on the performance of the entire computer system. It may be possible to detect such events by correlating the data that is stored within the various thread memory buffers.

In another example, the at least one buffer is a global memory buffer. This embodiment may be advantageous that the data for all of the threads is stored in the global memory buffer. This for example may be advantageous when the anomalous program execution event is related to a global property of the computer system.

In another example, the anomalous program event detector module is configured to detect the anomalous program execution event according to a set of anomalous program execution event rules. For example, the set of anomalous program execution event rules may contain a number of hardwired conditions that trigger the identification or detection of the anomalous program execution event.

In another example, the set of anomalous program execution event rules is selected from the group of: one or more event exceptions, one or more return codes, one or more error tags, and combinations thereof. This embodiment may be beneficial because these are all discreet and easily identified events which may be used to trigger the detection of the anomalous program execution event.

In another example, the anomalous program event detector module is configured to detect the anomalous program execution event in response to any one selected from the group of: entries in specific programming tasks, declines in resource usage of the computer system, changes in memory usage outside a predetermined range, exceeding boundary values for one or more variables, exceeding boundary variables for one or more counters, and combinations thereof. This embodiment may be beneficial because the anomalous program execution event detector module can be configured to detect any of the above mentioned which may occur when a program does not execute properly.

In another example, the anomalous program event detector module comprises an event detection neural network trained to output the anomalous program execution event signal in response to receiving buffered log data that is descriptive of a failure of the execution of the one or more threads. The event detection neural network may be trained so that it is able to recognize individual parts of the buffered log data which indicate an anomalous program execution event, or it may also be useful for recognizing patterns of data in the buffered log data which represent an anomalous program execution event. This may be beneficial because in some cases it may be difficult to list a set of specific rules which in all cases indicate when an anomalous program execution event has occurred. In using a neural network training with specific events that are recognized as causing anomalous program execution events may be detected when there are no explicit rules which could be used.

In another example, the log dependency analyzer module is configured to select the event-specific log data from the buffered log data by using selection rules determined by the anomalous program execution event. In this embodiment specific rules, which may for example be explicitly written or hardwired, may be used to raise the signal for the anomalous program execution event.

In another example, the log dependency analyzer module is configured to select the event-specific log data dynamically by the content of in-memory buffers indicated in the anomalous program execution event. For example, the in-memory buffers may be a thread memory buffer that stores buffered log data.

In another example, the log dependency analyzer module dynamically selects the event-specific log data by performing any one of the following selected from the group of: determining an indicated memory stack used during the anomalous program execution event and select buffered log data associated with the indicated memory stack, gather prior log events selected from the buffered log data that occur before the anomalous program execution event above a predetermined log level, gather related log events selected from the buffered log data that are dependent upon the anomalous program execution event, and combinations thereof. This embodiment is beneficial because any of the aforementioned examples may be used to select the event-specific log data dynamically.

In another example, the log dependency analyzer module comprises a dependency analyzer neural network trained to select the event-specific log data from the buffered log data in response to receiving the anomalous program execution event signal. This embodiment may be beneficial because the dependency analyzer neural network may be more robust in selecting the proper buffered log data than a system that uses explicit rules.

In another example, the at least one memory buffer is selected from the group of: dynamically allocated according to a rate of receiving anomalous program execution event signals, stored in temporary memory, and combinations thereof. This embodiment may be beneficial because the at least one memory buffer may for example be allocated dynamically as space in the buffer is needed. This may have an effect on reducing the overhead necessary for generating the event-specific log files.

In another example, the log archive writer module is configured to delete the event-specific log file if it duplicates an existing event-specific log file. This may be beneficial because it may reduce the amount of storage necessary to store a number of event-specific log files. This may also help in the review of the event-specific log files because an operator would not need to read or examine duplicate event-specific log files.

In another example, the log archive writer module is configured to replace the event-specific log file with a link to an existing event-specific log file if the event-specific log file duplicates the existing event-specific log file data. This may be beneficial because it may save on machine resources for storing multiple event-specific log files as well as providing an indication to the operator that a particular error has occurred repeatedly.

In another example, the log archive writer module is configured to determine that the event-specific log file duplicates an existing event-specific log file that overlaps the contents of the existing event-specific log file in more than a predetermined threshold. For example, to determine this being identical the two event-specific log files need not be 100% or completely the same. If they are above a certain percentage the same then in some situations it is not necessary to store or retrieve the event-specific log file.

The computer system is configured for generating the buffered log data by executing the one or more threads in a debug mode. For example, programs may be provided or compiled on a different computer system. When they are operating normally, they may produce little or no data for a log file. By executing programs in a particular thread in a debug mode the log data can be directed to the at least one memory buffer. Operating in a debug mode may also be beneficial because it will provide very detailed information for the event-specific log file.

FIG. 1 illustrates an example of a computer system. The illustration in FIG. 1 is a functional diagram. The computer system 100 is shown as executing a process 102. The process 102 is shown as possibly containing multiple threads 104. Each of the threads contains execution of at least one program 106. In this example there is also a thread memory buffer 110 that may be a part of each thread 104. Within the process 102 there is an anomalous program event detector module 114. The anomalous program event detector module 114 is used to detect anomalous program execution events. Within each process 102 there is also a log dependency analyzer module 116 that is able to search for log data that is relevant to a detected anomalous program execution event.

The log dependency analyzer module 116 searches the thread memory buffer 110. The computer system 100 also implements a log archive writer module 118. The log archive writer module 118 may be used to write or generate event-specific log files 132. The program 106 can be seen as outputting buffered log data 124. The program 106 also optionally outputs log data 120. The log data 120 may be used to generate the optional log file 122. For example, the log file 122 could be a conventional or non-event-specific log file that is typically generated by the program 106. The program 106 is also shown as providing buffered log data 124 to the thread memory buffer 110.

The buffered log data 124 may be more detailed than the log data 120. The log data 120 and 124 may for example be produced by different streams or they may be produced as a separate stream and the log data 120 has a lower log level than the buffered log data 124. For example, the process 102 may cause the execution of threads 104 to run their programs 106 in a debug mode so that they produce a large amount and detailed buffered log data 124.

The thread memory buffer 110 may be implemented in different ways. It may for example be allocated dynamically as part of the thread 104. The thread memory buffer 110 may also for example retain its contents only for a certain or predetermined period of time. In this example the buffered log data 124 may have a persistence for a certain period of time within the thread memory buffer 110. During execution of the program 106 the anomalous program event detector module 114 receives thread execution data 126. This may be different in different examples. The thread execution data 126 may for example represent data on the execution of the overall program 106. Various messages, flags, exceptions, a monitoring of variables staying within bounds or other details may all be monitored by the anomalous program event detector module 114.

The anomalous program event detector module 114 may also take the buffered log data 124 also. For example, the anomalous program event detector module 114 may look for patterns in the buffered log data 124 that indicate a failure. When the anomalous program event detector module 114 detects an anomalous program execution event it generates an anomalous program event signal 128. This is passed to the log dependency analyzer module 116. The log dependency analyzer module 116 then searches the thread memory buffer 110 for event-specific log data 130 that is related to or correlated to the anomalous program event signal 128. The event-specific log data 130 is sent to the event-specific log writer module 118. The log archive writer module 118 then generates an event-specific log file 132. Entries in the event-specific log file 132 and the log file 122 may for example be in the form of multiple log records 134. Each of the log records 134 may for example comprise meta data 136 and one or more messages 138.

Figure 2:
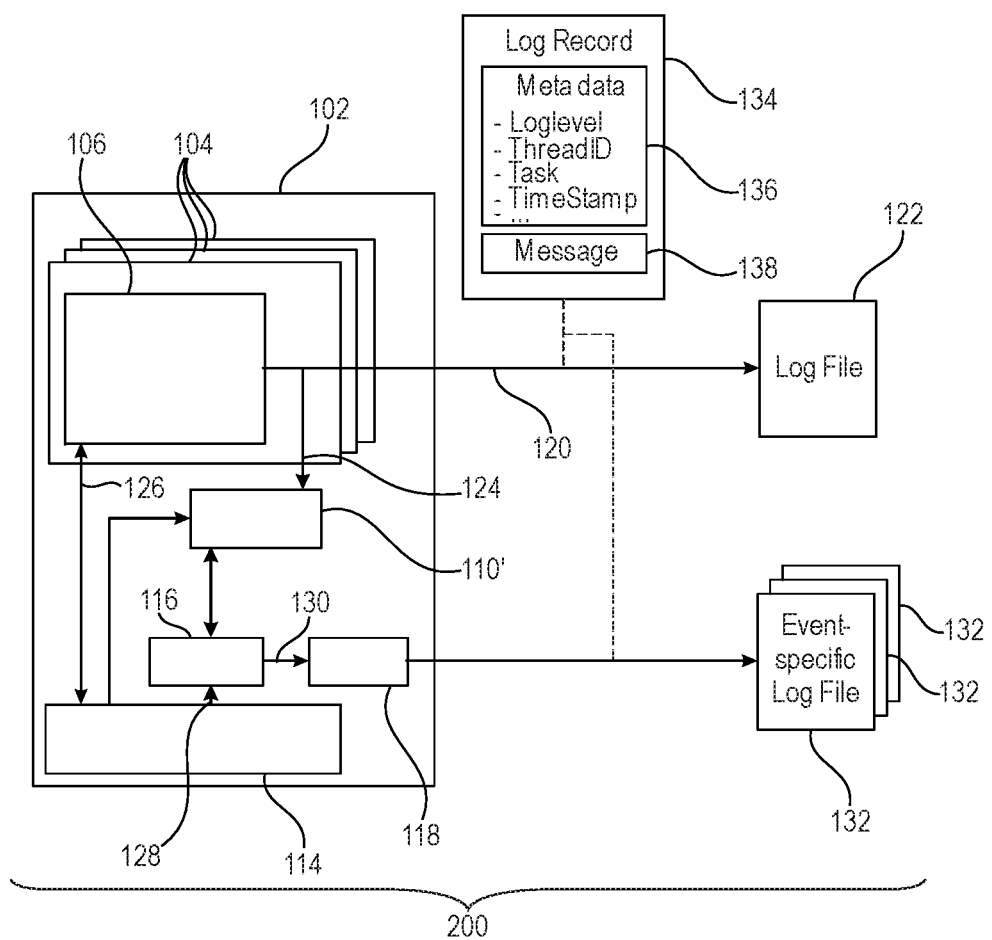
FIG. 2 illustrates a further implementation of a computer system.

FIG. 2 illustrates a further example of a computer system 200. The computer system illustrated in FIG. 2 is similar to the computer system 100 illustrated in FIG. 1 except instead of having a thread memory buffer 110 associated with each thread 104 there is instead a global memory buffer 110'. In this example the global memory buffer 110' is shown as being part of the process 102. The global memory buffer could also be global to multiple processes. In other words, the global memory buffer 110' may also be the buffer for multiple processes 102. The operation and function of the computer system 200 is similar to that as is illustrated in FIG. 1 except the buffered log data 124 from each of the threads 104 are all sent to the global memory buffer 110'. If an anomalous program event is detected in any of the threads 104 then the log dependency analyzer module 116 searches the global memory buffer 110' to search for the event-specific log data 130.

Figure 3:
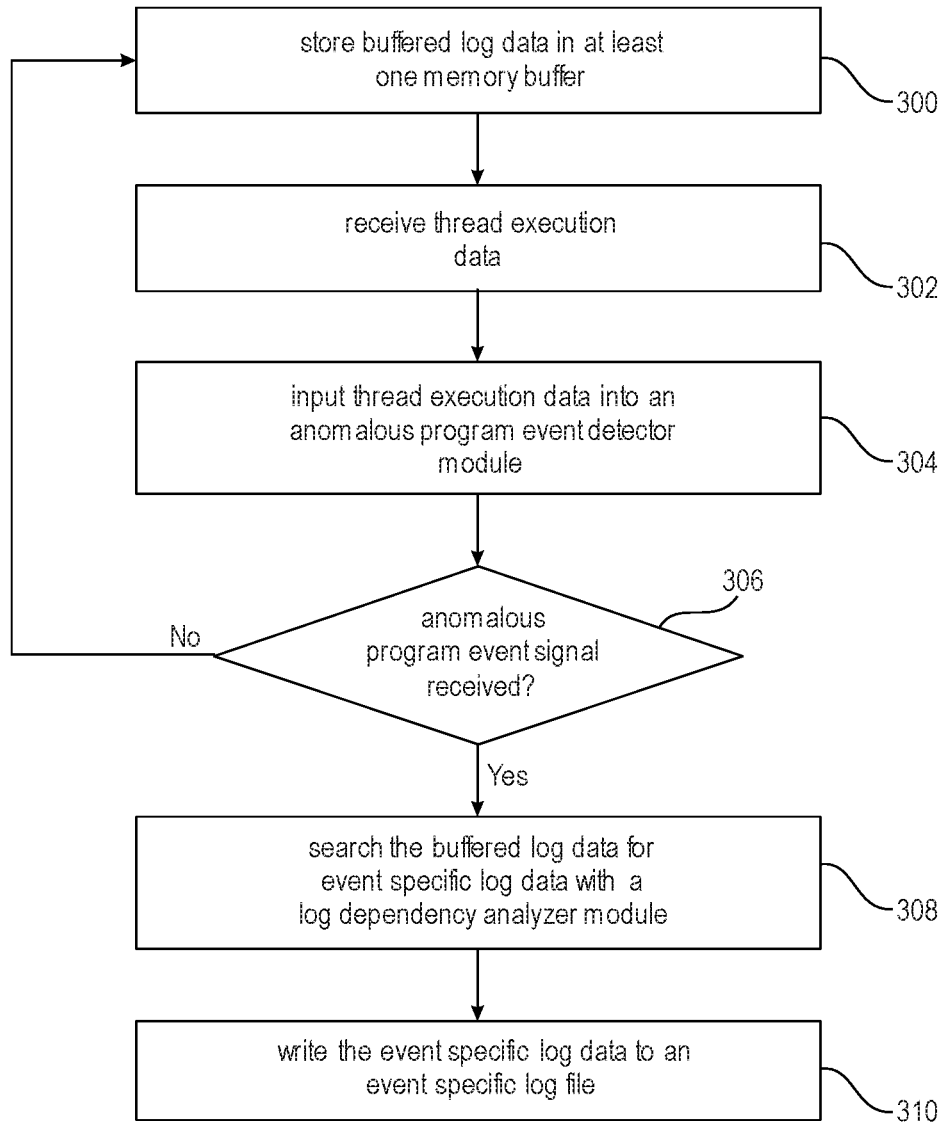
FIG. 3 is a flowchart of a method for generating an event specific log file.

FIG. 3 shows a flowchart which illustrates a method of generating an event-specific log file for a computer system such as is illustrated in FIG. 1 or FIG. 2. First in step 300 the method comprises storing buffered log data 124 in at least one memory buffer 110, 110' during execution of one or more threads 104 in real time. Next in step 302 the method comprises receiving thread execution data that is descriptive of the execution of the one or more threads 104 in real time. Then in step 304 the thread execution data is input into an anomalous program event detector module.

The anomalous program event detector module 114 may be configured such that it is able to detect anomalous program events such as a failure in a program in a thread or other performance failures of the computer system 100, 200. If it does detect this it then outputs an anomalous program event signal 128. The method then proceeds to step 306. In step 306 is a decision box. The question is "has an anomalous program event signal been received?" If the answer is no then the method proceeds back to step 300 and the system continues to store more buffered log data and search for anomalous program execution events. If the answer to the question in box 306 is yes, then the method proceeds to box 308. In box 308 the log dependency analyzer module 116 searches the memory buffer 110 or 110' for event-specific log data 130. The method then proceeds to box 310. In box 310 the log archive writer module 118 formats the event-specific log data 130 into an event-specific log file 132.

Figure 4:
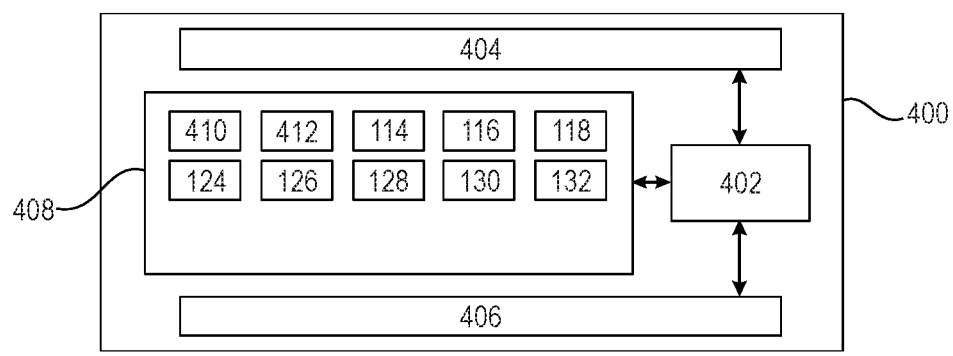
FIG. 4 is a block diagram of a computer system in accordance with an example of the present subject matter.

FIG. 4 depicts a further example of a computer system 400. The computer system comprises a processor 402 that is connected to a network interface 404 and a one or more user interfaces 406.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments, computer storage may also be computer memory or vice versa.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

The processor 402 is further shown as being connected to a memory 408. The memory is shown as containing an operating system 410. In addition to containing the operating system 410 the memory 408 is further shown as containing computer-readable program code 412. The computer-readable program code 412 for example may enable the processor 402 to implement the computer systems such as are depicted in FIGS. 1 and 2. Additionally the memory 408 is shown as containing an anomalous program event detector module 114, a log dependency analyzer module 116, and a log archive writer module 118. Various components and data from FIGS. 1 and 2 may also be stored in the memory 408 temporarily or on a long-term basis. The memory 408 is further shown as containing buffered log data 124, thread execution data 126, an example of an anomalous program event signal 128. The memory 408 is further shown as containing an event-specific log data 130 and an event-specific log file 132.

The methods described herein may be in the form of a source program, executable program 412 (object code), script, or any other entity comprising a set of instructions 412 to be performed. When a source program, then the program may be translated via a compiler, assembler, interpreter, or the like, which may or may not be included within the memory 408, so as to operate properly in connection with the operating system 410. Furthermore, the methods can be written as an object-oriented programming language, which has classes of data and methods, or a procedure programming language, which has routines, subroutines, and/or functions.

In exemplary embodiments, a conventional keyboard and mouse can be coupled to the input/output controller. Other output devices such as the I/O devices may include input devices, for example but not limited to a printer, a scanner, microphone, and the like. Finally, the I/O devices 10, may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices, can be any generalized cryptographic card or smart card known in the art. The system 100, 200, 400 can further include a display controller coupled to a display. In exemplary embodiments, the system 100, 200, 400 can further include a network interface 404 for coupling to a network. The network can be an IP-based network for communication between the computer 400 and any external server, client and the like via a broadband connection. The network transmits and receives data between the computer 400 and external systems, which can be involved to perform part, or all of the steps of the methods discussed herein. In exemplary embodiments, network can be a managed IP network administered by a service provider. The network may be implemented in a wireless fashion, e.g., using wireless protocols and technologies, such as WiFi, WiMax, etc. The network can also be a packet-switched network such as a local area network, wide area network, metropolitan area network, Internet network, or other similar type of network environment. The network may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 400 is a PC, workstation, intelligent device or the like, the software in the memory 408 may further include a basic input output system (BIOS). The BIOS is a set of essential software routines that initialize and test hardware at startup, start the operating system 410, and support the transfer of data among the hardware devices. The BIOS is stored in ROM so that the BIOS can be executed when the computer 400 is activated.

When the computer 400 is in operation, the processor 402 is configured to execute software 412 stored within the memory 408, to communicate data to and from the memory 408, and to generally control operations of the computer 400 pursuant to the software 412. The methods described herein and the operating system 410, in whole or in part, but typically the latter, are read by the processor 402, possibly buffered within the processor 402, and then executed.

When the systems and methods described herein are implemented in software 412, as is shown in FIGS. 1 and 2, the methods can be stored on any computer readable medium, such as storage 408, for use by or in connection with any computer related system or method. The storage 408 may comprise a disk storage such as HDD storage.

The analysis of problems is often impossible after the fact due to the fact that a log file only contains specific messages. If the messages necessary to debug the problem aren't contained in the log file, an analysis is not possible. In this case, the log level needs to be adjusted, which results in a much larger log file containing information irrelevant for debugging the problem, and the user has to recreate the problem. If recreation is impossible, debugging and fixing the problem is impossible as well, which leads to unfixed problems in the software as well as lower user satisfaction.

In order to allow after-the-fact analysis of problems where log messages are not contained in the log file, examples may provide a mechanism which does not require a recreation of the problem. Furthermore, examples may also not require changing the log level. It also reduces the overall log volume, which is collected and transmitted to the software manufacturer, which saves time during transfer as well as during analysis as the log volume is considerably lower which makes the log messages originating from the problem easier to spot.

During regular program processing, log records are written to the in-memory buffer 110, 110'. Log records with the log level above the configured log level threshold are optionally persisted synchronously to the log file 122. If the log event detector (anomalous program event detector module 114) finds an anomalous event, then the log dependency analyzer (log dependency analyzer module 116) detects related log records inside the in-memory buffer (at least one memory buffer, thread memory buffer 110, or global memory buffer 110'). The identified subset of log records (event specific log data 130) is persisted subsequently to an event-specific log file (event specific log file 132. As a consequence, log records are written to the event-specific log file that would have not been written to the regular log file. In addition, the event-specific log file does not contain unrelated log records. In order to minimize the runtime impact, each thread may possibly maintain a dedicated in-memory buffer that does not need to synchronize with other threads in the process. This for example would eliminate the need for a locking mechanism which would reduce system performance.

In some examples, the log event detector identifies two different types of events: events explicitly occurring during program flow (e.g. thrown exceptions, return codes, etc.) and events implicitly detected by analyzing the in-memory buffers for specific patterns. Upon the detection of such an event the log dependency analyzer is triggered to extract event related log records.

In some examples, the log dependency analyzer evaluates rules to identify and extract the related log records for the triggering log event. Such rules might be statically defined, e.g. for event X: Gather all records of component Y. In another example such rules might determine related log records dynamically based on the content of the in-memory buffers, e.g.: for event X: Analyze the call stack of the thread generating X and gather the records of all involved components, or for event Y: Analyze all available log records that have been generated by threads/tasks prior or parallel to event Y and gather their log records having a specific log level. All gathered log records (event specific log data 130) may be written to an event-specific log archive and the log archive writer is notified.

The log archive writer module persists (stores) the event specific log data in an event specific log file. In some examples, the log archive writer might consider the previously written archives to: reject persisting the new archive because a certain percentage of its log records has already been persisted by another archive, or modify the archive prior to persisting it, e.g. filtering already persisted log records and inserting a link to them.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Various embodiments may possibly be described by one or more of the following features specified in the following numbered clauses:

Clause 1. A method of generating an event specific log file for a computer system, the method comprising: storing buffered log data in at least one memory buffer during the execution of one or more threads in real time; receiving thread execution data descriptive of the execution of the one or more threads in real time; inputting the thread execution data into an anomalous program event detector module, wherein the anomalous program event detector module is configured to detect an anomalous program execution event in the thread execution data; and wherein the anomalous program event detector module is further configured to generate an anomalous program event signal in response to detecting the anomalous program execution event in the thread execution data; searching the buffered log data for event specific log data in the at least one memory buffer with a log dependency analyzer module in response to the anomalous program event detector module generating the anomalous program event signal, wherein the log dependency analyzer module is configured for selecting event specific log data from the buffered log data specified by the anomalous program execution event; and writing the event specific log data to an event specific log file using a log archive writer module configured to format the event specific log data as the event specific log file.

Clause 2. The method of clause 1, wherein the at least one memory buffer comprises a thread memory buffer for each of the one or more threads, and wherein for each of the one or more threads the buffered log data is divided into and stored as thread specific log data in the respective thread memory buffer.

Clause 3. The method of cause 2, wherein the anomalous program event detector module is configured to detect the anomalous program execution event by correlating the thread specific log data across the at least one thread memory buffer.

Clause 4. The method of clause 1, wherein the at least one buffer is a global memory buffer.

Clause 5. The method of any one of clauses 1 through 4, wherein the anomalous program event detector module is configured to detect the anomalous program execution event according to a set of anomalous program execution event rules.

Clause 6. The method of clause 5, wherein the set of anomalous program execution event rules comprise any one of the following: one or more event exceptions, one or more return codes, one or more error tags, and combinations thereof.

Clause 7. The method of any one of clauses 1 through 6, wherein the anomalous program event detector module is configured to detect the anomalous program execution event in response to any one of the following: entries in specific programming tasks, declines in resource usage of the computer system, changes in memory usage outside of a predetermined range, exceeding boundary values for one or more variables, exceeding boundary values for one or more counters, and combinations thereof.

Clause 8. The method of any one of clauses 1 through 7, wherein the anomalous program event detector module comprises an event detection neural network trained to output the anomalous program execution event signal in response to receiving buffered log data that is descriptive of a failure of the execution of the one or more threads.

Clause 9. The method of any one of clauses 1 thorough 8, wherein the log dependency analyzer module is configured to select the event specific log data from the buffered log data by using selection rules determined by the anomalous program execution event.

Clause 10. The method of any one of clauses 1 through 9, wherein the log dependency analyzer module is configured to select the event specific log data dynamically by the content of in-memory buffers indicated in the anomalous program execution event.

Clause 11. The method of clause 10, wherein log dependency analyzer module dynamically selects the event specific log data by performing any one of the following: determining an indicated memory stack used during the anomalous program execution event and select buffered log data associated with the indicated memory stack; gathering prior log events selected from the buffered log data that occurred before the anomalous program execution event above a predetermined log level; gathering related log events selected from the buffered log data that are dependent upon the anomalous program execution event; and combinations thereof.

Clause 12. The method of any one of clauses 1 through 11, wherein the log dependency analyzer module comprises a dependency analyzer neural network trained to select the event specific log data from the buffered log data in response to receiving the anomalous program execution event signal.

Clause 13. The method of any one of clauses 1 through 12, wherein the at least one memory buffer is any one of the following: dynamically allocated according to a rate of receiving anomalous program execution event signals, stored in temporary memory, and combinations thereof.

Clause 14. The method of any one of clauses 1 through 13, wherein the log archive writer module is configured to delete the event specific log file if it duplicates an existing event specific log file.

Clause 15. The method of any one of clauses 1 through 13, wherein the log archive writer module is configured to replace the event specific log file with a link to an existing event specific log file if the event specific log file duplicates the existing event specific log data.

Clause 16. The method of clause 14 or 15, wherein the log archive writer module is configured to determine that the event specific log file duplicates the existing event specific log file if it overlaps the contents of the existing event specific log file by more than a predetermined threshold.

Clause 17. The method of any one of clauses 1 through 16, wherein the computer system is configured for generating the buffered log data by executing the one or more threads in a debug mode.

Clause 18. A computer program product comprising a computer-readable storage medium having computer-readable program code embodied therewith, the computer-readable program code configured to implement the method of any one of clauses 1 through 17.

Clause 19. A computer system comprising: a processor configured for controlling the computer system; and a memory storing machine executable instructions, wherein execution of the instructions causes the processor to: store buffered log data in at least one memory buffer during the execution of one or more threads in real time; receive thread execution data descriptive of the execution of the one or more threads in real time; input the thread execution data into an anomalous program event detector module, wherein the anomalous program event detector module is configured to generate an anomalous program event signal in response to detecting the anomalous program execution event in the thread execution data; search the log data in the at least one memory buffer with a log dependency analyzer module in response to the anomalous program event detector module signaling the anomalous program event, wherein the log dependency analyzer module is configured for selecting event specific log data from the buffered log data according to the anomalous program execution event; and write the event specific log data to the event specific log file using a log archive writer module configured to format the event specific log data as the event specific log file.

What is claimed is:

1. A method for generating an event specific log file for a computer system, the method comprising:
    storing buffered log data in at least one memory buffer during an execution of one or more threads in real time;
    receiving thread execution data descriptive of the execution of the one or more threads in real time;
    inputting the thread execution data into an anomalous program event detector module, wherein the anomalous program event detector module is configured to detect an anomalous program execution event in the thread execution data; and wherein the anomalous program event detector module is further configured to generate an anomalous program event signal in response to detecting the anomalous program execution event in the thread execution data;
    searching the buffered log data for event specific log data in the at least one memory buffer with a log dependency analyzer module in response to the anomalous program event detector module generating the anomalous program event signal, wherein the log dependency analyzer module is configured for selecting event specific log data from the buffered log data specified by the anomalous program execution event; and wherein the log dependency analyzer module is configured to dynamically select the event specific log data by the content of in-memory buffers indicated in the anomalous program execution event; and writing the event specific log data to an event specific log file using a log archive writer module configured to format the event specific log data as the event specific log file.

2. The method of claim 1, wherein the at least one memory buffer comprises a thread memory buffer for each of the one or more threads, and the buffered log data is divided into and stored as thread specific log data in the respective thread memory buffer.

3. The method of claim 2, wherein the anomalous program event detector module is configured to detect the anomalous program execution event by correlating the thread specific log data across the at least one thread memory buffer.

4. The method of claim 1, wherein the at least one memory buffer is a global memory buffer.

5. The method of claim 1, wherein the anomalous program event detector module is configured to detect the anomalous program execution event according to a set of anomalous program execution event rules.

6. The method of claim 5, wherein the set of anomalous program execution event rules comprise one or more of the following: one or more event exceptions, one or more return codes, or one or more error tags.

7. The method of claim 1, wherein the anomalous program event detector module is configured to detect the anomalous program execution event in response to one or more of the following: entries in specific programming tasks, declines in resource usage of the computer system, changes in memory usage outside of a predetermined range, exceeding boundary values for one or more variables, or exceeding boundary values for one or more counters.

8. The method of claim 1, wherein the anomalous program event detector module comprises an event detection neural network trained to output the anomalous program event signal in response to receiving buffered log data that is descriptive of a failure of the execution of the one or more threads.

9. The method of claim 1, wherein the log dependency analyzer module is configured to select the event specific log data from the buffered log data by using selection rules determined by the anomalous program execution event.

10. The method of claim 1, wherein the log dependency analyzer module dynamically selects the event specific log data by performing one or more of the following:
determining an indicated memory stack used during the anomalous program execution event and selecting buffered log data associated with the indicated memory stack;
gathering prior log events selected from the buffered log data that occurred before the anomalous program execution event above a predetermined log level; or
gathering related log events selected from the buffered log data that are dependent upon the anomalous program execution event.

11. The method of claim 1, wherein the log dependency analyzer module comprises a dependency analyzer neural network trained to select the event specific log data from the buffered log data in response to receiving the anomalous program event signal.

12. The method of claim 1, wherein the at least one memory buffer is dynamically allocated according to a rate of receiving anomalous program event signals or stored in temporary memory.

13. The method of claim 1, wherein the log archive writer module is configured to delete the event specific log file based, at least in part on, a determination that duplicates are present in an existing event specific log file.

14. The method of claim 1, wherein the log archive writer module is configured to replace the event specific log file with a link to an existing event specific log file based, at least in part, on a determination that the event specific log file includes duplicates from the existing event specific log data.

15. The method of claim 1, wherein the log archive writer module is configured to determine that the event specific log file duplicates an existing event specific log file based, at least in part, on a determination that the event specific log file overlaps the contents of the existing event specific log file by more than a predetermined threshold.

16. The method of claim 1, wherein the computer system is configured for generating the buffered log data by executing the one or more threads in a debug mode.

17. A computer program product for generating an event specific log file for a computer system, the computer program product comprising:
one or more computer-readable storage media and program instructions stored on the one or more computer-readable storage media, the program instructions comprising:
program instruction to store buffered log data in at least one memory buffer during an execution of one or more threads in real time;
program instruction to receive thread execution data descriptive of the execution of the one or more threads in real time;
program instruction to input the thread execution data into an anomalous program event detector module, wherein the anomalous program event detector module is configured to detect an anomalous program execution event in the thread execution data; and wherein the anomalous program event detector module is further configured to generate an anomalous program event signal in response to detecting the anomalous program execution event in the thread execution data;
program instruction to search the buffered log data for event specific log data in the at least one memory buffer with a log dependency analyzer module in response to the anomalous program event detector module generating the anomalous program event signal, wherein the log dependency analyzer module is configured for selecting event specific log data from the buffered log data specified by the anomalous program execution event; and wherein the log dependency analyzer module is configured to dynamically select the event specific log data by the content of in-memory buffers indicated in the anomalous program execution event; and
program instruction to write the event specific log data to an event specific log file using a log archive writer module configured to format the event specific log data as the event specific log file.

18. The computer program product of claim 17, wherein the log dependency analyzer module dynamically selects the event specific log data by performing one or more of the following:
   determining an indicated memory stack used during the anomalous program execution event and selecting buffered log data associated with the indicated memory stack;
   gathering prior log events selected from the buffered log data that occurred before the anomalous program execution event above a predetermined log level; or
   gathering related log events selected from the buffered log data that are dependent upon the anomalous program execution event.

19. A computer system for generating an event specific log file, the computer system comprising:
   one or more computer processors;
   one or more computer readable storage media; and
   program instructions stored on the computer readable storage media for execution by at least one of the one or more processors, the program instructions comprising:
      program instruction to store buffered log data in at least one memory buffer during an execution of one or more threads in real time;
      program instruction to receive thread execution data descriptive of the execution of the one or more threads in real time;
      program instruction to input the thread execution data into an anomalous program event detector module, wherein the anomalous program event detector module is configured to detect an anomalous program execution event in the thread execution data; and wherein the anomalous program event detector module is further configured to generate an anomalous program event signal in response to detecting the anomalous program execution event in the thread execution data;
      program instruction to search the buffered log data for event specific log data in the at least one memory buffer with a log dependency analyzer module in response to the anomalous program event detector module generating the anomalous program event signal, wherein the log dependency analyzer module is configured for selecting event specific log data from the buffered log data specified by the anomalous program execution event; and wherein the log dependency analyzer module is configured to dynamically select the event specific log data by the content of in-memory buffers indicated in the anomalous program execution event; and
      program instruction to write the event specific log data to an event specific log file using a log archive writer module configured to format the event specific log data as the event specific log file.

20. The computer system of claim 19, wherein the log dependency analyzer module dynamically selects the event specific log data by performing one or more of the following:
   determining an indicated memory stack used during the anomalous program execution event and selecting buffered log data associated with the indicated memory stack;
   gathering prior log events selected from the buffered log data that occurred before the anomalous program execution event above a predetermined log level; or
   gathering related log events selected from the buffered log data that are dependent upon the anomalous program execution event.

* * * * *